United States Patent

[11] 3,619,298

[72] Inventors Jean Firmin Jammet
Poitiers;
Alain Blondel, Lillebonne; Yannick
Marsault, Poitiers, all of France
[21] Appl. No. 59,994
[22] Filed July 31, 1970
[45] Patented Nov. 9, 1971
[73] Assignee Societe Des Accumulateurs Fixes Et De
Traction (Societe Anonyme)
Point de La Folie, Romainville, France
[32] Priority Aug. 1, 1969
[33] France
[31] 6926542

[54] DEFERRED-ACTION ELECTROCHEMICAL GENERATORS
12 Claims, 3 Drawing Figs.
[52] U.S. Cl..................................................... 136/114,
136/90
[51] Int. Cl........................................................H01m 21/10
[50] Field of Search........................................... 136/114,
112, 113, 90, 162, 166

[56] References Cited
UNITED STATES PATENTS
2,938,065 5/1960 Bauer........................... 136/90

*Primary Examiner*—Winston A. Douglas
*Assistant Examiner*—C. F. Lefevour
*Attorney*—Kenyon & Kenyon Reilly Carr & Chapin ABSTRACT: Deferred-action electrochemical cells or generators wherein the electrolyte in a reservoir and electrodes in a container are maintained separately sealed off from each other by frangible membranes that can be ruptured by appropriate priming devices for activation of the cell or generator by flow of electrolyte from the reservoir into the container. In case of electrodes of lithium these must be maintained in an inert or neutral gas in the sealed container to prevent their alteration or deterioration during storage. Upon priming or breaking of the frangible membranes electrolyte flows from the reservoir into the container and simultaneously the neutral or inert gas is driven out of the electrode container and is directed via a conduit into the electrolyte reservoir wherein it is retained. A closed system is thus provided wherein neither electrolyte or inert gas can escape to the surrounding environment. Preferably, the reservoir and containers are enclosed in an overall fluidtight enclosure. Thus, spillage of electrolyte from the primed cell or generator upon vibration, irregular movements or overturning of the primed cell or generator and its loss to environment is avoided, as is damage from spilled electrolyte. At the same time, operation of the cell or generator continues undisturbed.

PATENTED NOV 9 1971 3,619,298

INVENTORS
JEAN FIRMIN JAMMET
ALAIN BLONDEL
BY YANNICK MARSAULT

ATTORNEYS

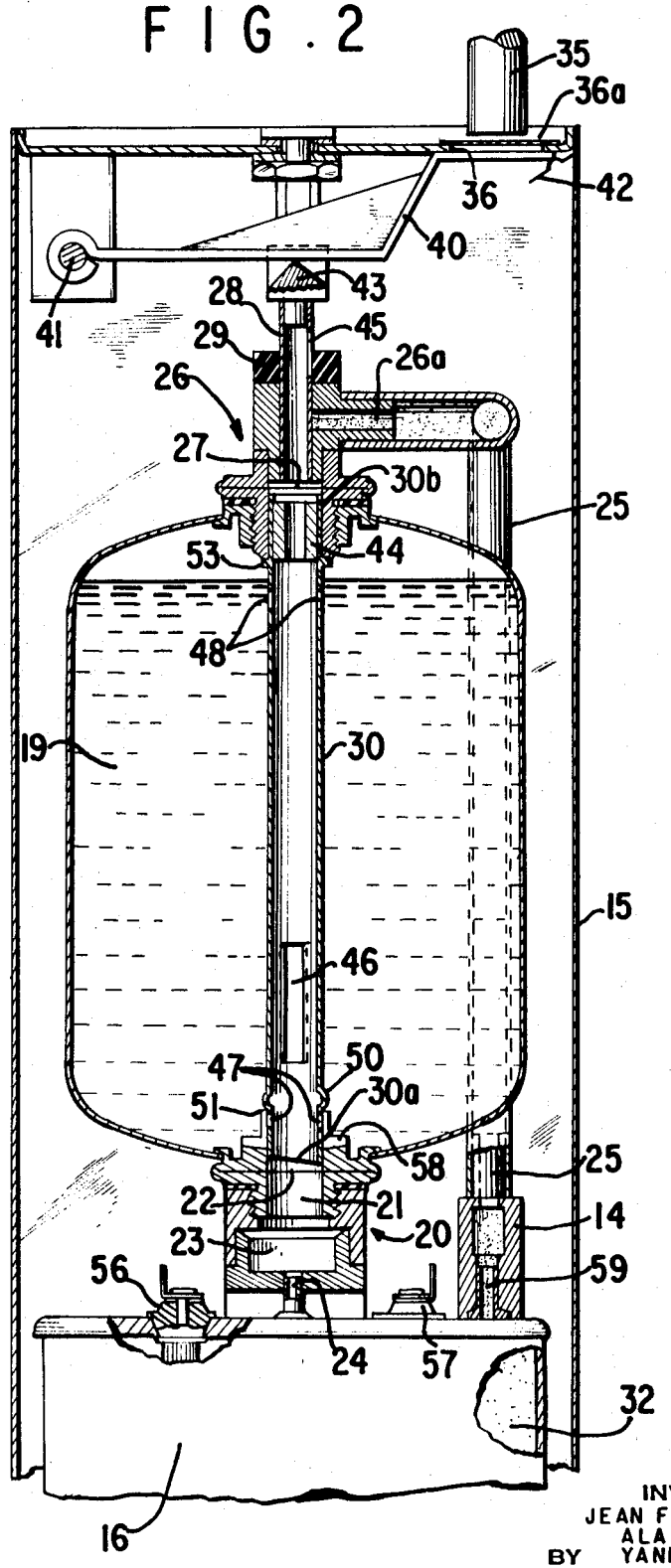

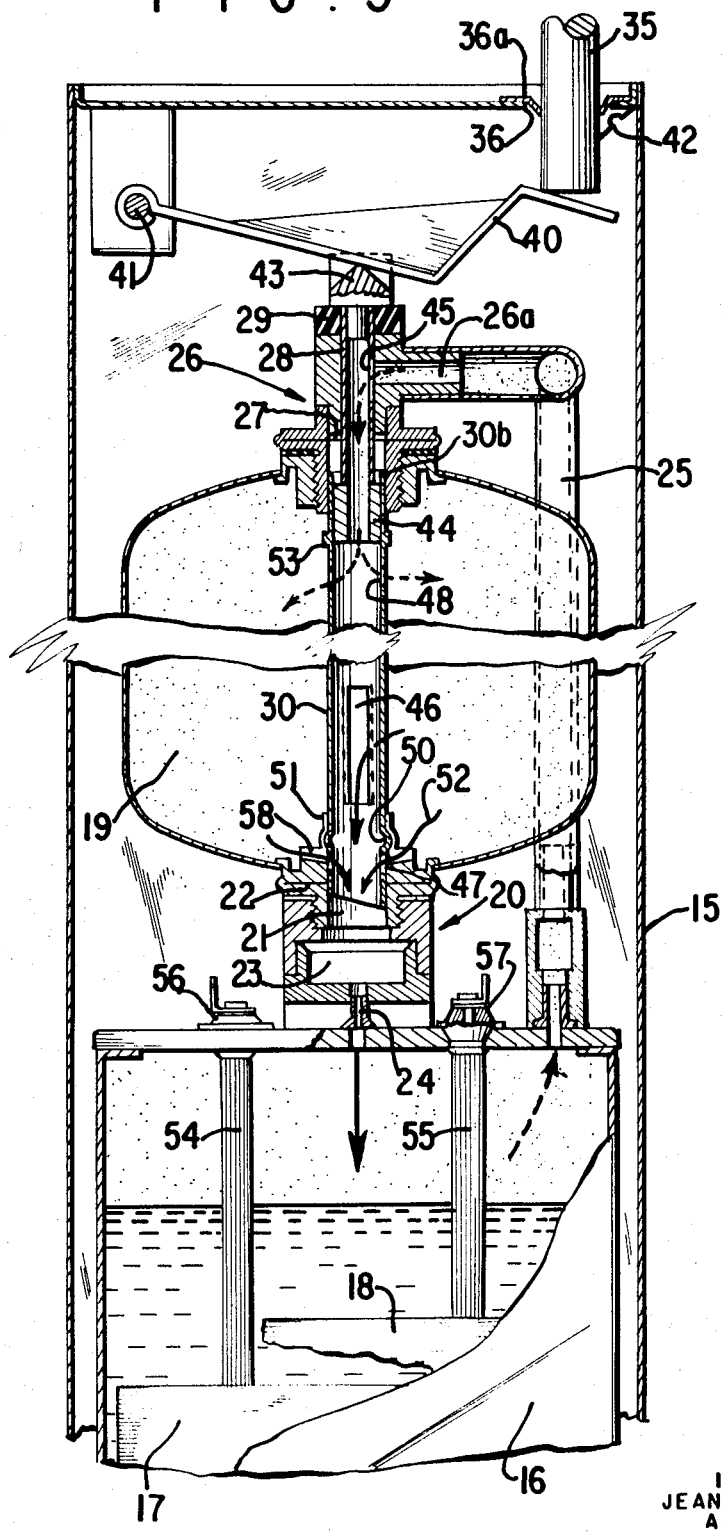

DEFERRED-ACTION ELECTROCHEMICAL GENERATORS

BRIEF SUMMARY OF INVENTION

The present invention relates to deferred-action cells or electrochemical generators of the type comprising a container enclosing the electrodes and as attached separate reservoir, containing a priming fluid such as the electrolyte connected to the said container by a duct which is stopped or sealed off during storage by a frangible membrane.

On priming to put the cell or generator into use, the said membrane is destroyed, thus enabling the electrolyte to flow from the reservoir into the container enclosing the electrodes, thus effecting cell activation.

In some of these types of cells, it is important and essential to keep the electrodes in a neutral or inert gas about the electrodes in the container before the priming, so as to avoid their alteration or deterioration. This is the case particularly with lithium electrode cells, where the said electrodes, before operation must be maintained in an inert gas such as argon.

In such cells, it is necessary to provide an orifice or hole in the container enclosing the electrode, so that the said neutral gas can escape therefrom, on priming and entry of electrolyte.

But in such event, if the container-reservoir combination comprising the deferred-action cell is subjected to various irregular movements such as jolts or heavy vibration and, particularly, if it is overturned, electrolyte can escape from the container through this orifice or hole, and thus, there is a danger, on the one hand, of disturbing the operation of the cell, and on the other hand, of causing damage by the electrolyte to the device in question and also to external objects in the surrounding environment by the electrolyte.

Principal objects and features of the present invention are to provide arrangements enabling these disadvantages to be overcome, and particularly to prevent escape of electrolyte as well as to provide a closed circuit system from which such escape is prevented.

To effect these objects, there is provided a deferred-action cell of the type comprising a container enclosing the electrodes and filled with a neutral gaseous atmosphere such as argon surrounding the electrodes. This container is combined with a reservoir containing a priming fluid, such as the requisite electrolyte. This reservoir is joined to the said container and communicates therewith via a duct which is stopped up or sealed prior to priming and during storage by a breakable or frangible membrane which is required to be ruptured or destroyed, to effect priming by appropriate means controlled by a priming device. The said container comprises, moreover, pipes or conduits communicating with the upper part of the reservoir, the said pipes or conduits being also stopped up or sealed during storage and prior to priming by a breakable or frangible partition, which is also used for completing sealing off the reservoir to prevent flow of gas from the container thereto. Means also controlled by the said priming device are provided for destroying the said partition, at the time of priming, thus enabling the neutral gas contained in the container to escape therefrom via the pipes or conduits into the reservoir, whereas the priming fluid because of membrane rupture simultaneously now flows from the reservoir via the duct into the container. The assembly consisting of the container, the duct, the reservoir and the communicating pipes or conduits preferably are kept in a fluidtight enclosure before and after priming so that a closed system results whereby escape or spillage of electrolyte to the surrounding environment is avoided.

According to an embodiment of this invention, the cell is primed by the action of the priming device which, upon operation, effects the destruction or rupture of the breakable partition which stops up the communicating pipes or conduits and also brings into operating action supplemental means to effect the destruction or rupture of the breakable membrane which stops up the duct between the container and the reservoir shortly after the said partition has been destroyed. Thus, influx of electrolyte into the container via the duct causes ejection of the gas from the container and its flow via the conduits or pipes into the reservoir.

Other objects, characteristics and features of the invention will become apparent from the following description and annexed drawing in which:

FIG. 2 shows in greater detail a particular embodiment of a set of such cells or generators and an associated reservoir according to the invention, in condition existing during storage and before priming; and FIG. 3 corresponds to FIG. 2, but shows the condition of the embodiment of FIG. 2 as its cell containers are being primed.

DETAILED DESCRIPTION

Figure 1:
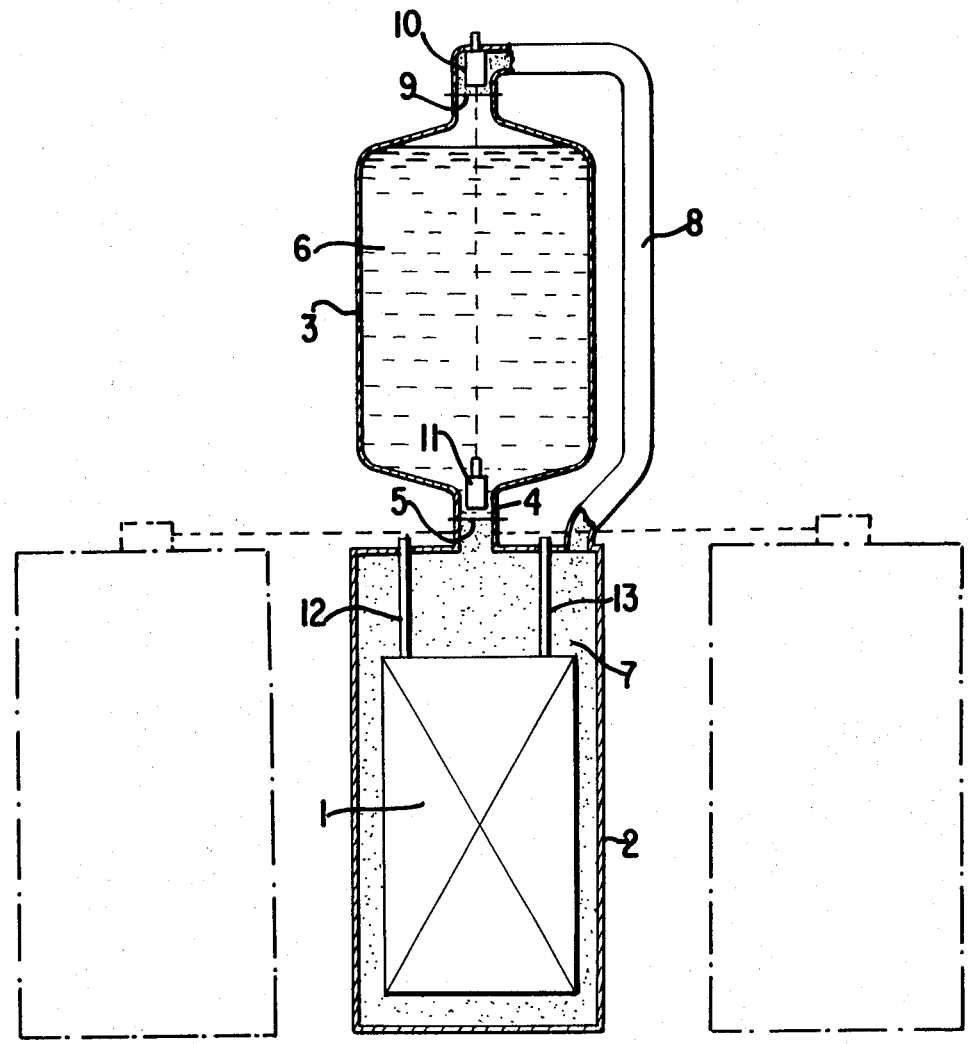
FIG. 1 shows, in a very diagrammatic way, a primable cell or electrochemical generator according to the invention.

In FIG. 1, reference character 1 denotes the set of positive and negative electrodes, which, if necessary, may be insulated from each other by appropriate separators. This set 1 is arranged inside a closed container 2, and the within atmosphere of this container surrounding the electrode set 1 prior to priming consists only of a neutral gas such as argon 7. Reference characters 12 and 13 are the electrical connecting terminals from the respective electrodes of set 1 of the cell. Above this container 2, there is positioned a closed reservoir 3 for storing therein priming fluid such as electrolyte. This reservoir communicates with the container 2 by a duct 4. A breakable or frangible membrane 5 normally seals duct 4 and in unbroken condition prevents the priming fluid 6 contained in the reservoir 3 from flowing into the container 2. According to the invention, the container 2 is connected to the upper part of the reservoir 3 by a pipe or conduit 8. A breakable partition 9 stops up or seals this pipe adjacent its entry point into the reservoir 3. This partition is unbroken until the cell is to be primed.

Reference characters 10 and 11 illustrate diagrammatically means which enable the destruction or rupture of the partition 9 and of the membrane 5 respectively. When it is desired to effect priming, the priming device or means (not shown in this figure but described hereafter) brings the said destructing means into rupturing action successively on partition 9 and membrane 5. When partition 9 and membrane 5 are ruptured the priming fluid 6 can then flow from reservoir 3 into the container 2 via duct 4 thus driving out the gas 7 in the container 2. This gas then escapes from the container 2 through the pipe or container 8 into the reservoir 3 via the upper end thereof whose partition 9 has been ruptured and replaces the priming fluid in the reservoir 3 which has been flowed from the latter into container 2 via duct 4.

This described priming system, therefore, enables a closed circuit operation of gas and priming fluid, thus ensuring perfect fluid and gastight sealing from the outside atmosphere or environment. Preferably, as is shown in FIGS. 2 and 3, the container reservoir assembly is located in a sealed enclosure.

It must be understood that, by means of an appropriate distribution system, a single reservoir for priming fluid can be used for delivering electrolyte from the reservoir for priming several cell assemblies contained in different containers, an appropriate collector and conduit system enabling the neutral gas contained before priming in each of the different containers to escape via such conduit system towards and into the said single reservoir.

Details concerning the application of invention to reservoir-container embodiments with a common reservoir and a plurality of primable cells or generators all according to the invention are shown in FIGS. 2 and 3. FIG. 2 shows the set of cells and reservoir in the storage state, whereas FIG. 3 shows the same set of cells and reservoir as the cells on being primed. In these two figures, the same reference numbers are assigned to the same parts, which can be in different positions in storage state and in priming state.

Reference character 15 denotes a fluidtight enclosure in which are positioned on the one hand, several containers 16 (one only being shown for clarity) each enclosing a set of positive and negative electrodes, if necessary, insulated from each other by suitable separators, and each container 16 having therein a neutral gas 32 such as argon and, on the other hand, a common reservoir 19 containing the priming fluid, for example, the electrolyte for priming all of the cell containers 16. The lower part of the reservoir 19 is connected to supply the priming fluid to all of the respective containers 16 by a distributor 20 comprising a duct opening 21 stopped or sealed up by a breakable or frangible membrane 22. Opening 21 of distributor 20 below its membrane 22 opens into a manifold 23. This manifold 23 communicates with the separate containers 16 by means of respective nozzles 24. Moreover, the containers 16 communicate with the reservoir 19 by means of a pipe or conduit 25 connected at its upper end to a coupling 26 fitted into the upper end of said reservoir 19 by any appropriate means. At its lower end pipe or conduit 25 joins a collector system 14 communicating separately with each of the respective containers 16 by the separate individual nozzles 59. Before priming as seen in FIG. 2, the coupling 26 is stopped up by a breakable or frangible partition 27, which prevents the priming fluid contained in the reservoir 19 from escaping from the said reservoir 19 or gas from the containers 16 from entering it via pipe 25.

The means for enabling the partition 27 to be destroyed or ruptured comprise a tubular plunger 28 guided for movement in the coupling 26. This plunger 28 has a window 45 that in the elevated position of plunger 28 as seen in FIG. 2 is out of register with duct 26a of coupling 26 so that the gas in the pipe 25 from containers 16 may not flow into tubular plunger 28 via window 45. Gas flow can only occur when the plunger 28 is moved downwardly for priming to rupture partition 27 at which time window 45 registers with duct 26a of coupling 26.

Reference character 29 is a plastic sealing member enabling the said plunger 28 to slide during priming, but intended, as will be seen below, to ensure the fluidtight sealing of the device after priming has been effected.

The means enabling the membrane 22 to be ruptured or destroyed on priming comprises a tubular plunger 30 with a wedge-shaped lower end 30 and guided at this end by the distributor 20, the other or upper end 30b of the said plunger 30 being guided slidably by the coupling 26.

The wall of the plunger 30 is provided with holes or apertures 46, 47 and 48 for permitting the fluids from the reservoir 19 to flow therethrough as is defined in the following operational description.

The priming operational means comprises a plunger 35 which is located outside of the enclosure 15 and which, on priming movement is designed to enter the said enclosure 15 through a hole 36, closed or stopped up normally by a metal membrane 36a, made of aluminum, for example. The plunger 35 when forced in by an operator, pushes a lever 40 which is pivoted about a pivot axis 41 located internally of enclosure 15 and whose opposite end is retained in the position of FIG. 2 before priming, as by means of a spring catch plate 42. When pushed inwardly the plunger 35 ruptures membrane 36 and rotates lever 40 about its pivot 41.

The lever 40, when pivotally moved by the inward pushing motion of the plunger 35 bears on an end piece or plug 43 on the upper end plunger 28. This end piece or plug 43 also seals the upper end of tubular plunger 28.

Downward motion of plunger 28 is thus effected by movement of the lever 40. The resulting downward movement of said plunger 28 then causes its lower end to pierce or rupture the partition 27 as seen in FIG. 3 and also pushes an upper end piece 44 of the plunger 30 downwardly; hence the lower wedge-shaped end 30a of the latter then pierces or ruptures the membrane 22. It is to be noted that respective ruptures of partition 27 and membrane 21 are successive in point of time.

The priming fluid contained in the reservoir 19 can upon rupture of membrane 21 then flow into the containers 16 under the effect of gravity. The priming fluid from reservoir 19 flows into the tube 30 through the holes or apertures 46 provided in this tube, particularly, holes 46 and 48 and holes 47 which latter are at the lower part of the said tube 30 and flows through the hole 21 of distributor 20 and fills the manifold 23 (heavy arrows in FIG. 3).

The priming fluid then flows out of the manifold 23 and thence into the respective containers 16 through their respective nozzles 24.

The priming fluid arriving in the respective containers 16 drives out the inert gas that they contain through the respective nozzles 59, the collector system 14 and the pipe 25. This gas from pipe enters the tube 28 through the window 45 which now registers with duct 26a as seen in FIG. 3 and then enters the tube 30 and fills the reservoir 19 after having passed through the holes in the tube 30 and more particularly the holes 48 (dotted-line arrows in FIG. 3). The location of window 45 in its elevated position shown in FIG. 2 with respect to duct 26a is such that the pipe 25 does not communicate with the tube 28 before the latter has been moved to the position of FIG. 3 when priming operations are effected.

As a safety measure, the lower end of the tube 30 is provided with bosses 50 which rest, before priming (FIG. 2), on the upper rim of a ring 51, for example, made of an elastomer such as polytetrafluoroethylene. Thus, the end 30a of the tube 30 prior to priming operations as seen in FIG. 2 is not in contact with the membrane 22 as this would risk, for example, under the effect of vibrations and/or of the weight of this tube, in leading to accidental damage of this membrane. This ring 50 is, however, deformable so that the tube 30 may descend when it is pushed downwardly by the tube 28 under the effect of the force exerted by the priming plunger 35 and lever 40.

It is possible to empty the reservoir 19 substantially completely of its priming fluid by a flow in the direction of the arrow 52 (FIG. 3) along appropriate grooves 58 into the distributor 20 and the holes 47 situated near the lower end of the tube 30.

On effecting of priming operations the end piece 43 engages the upper end of sealing ring 29 and thus stops up the hole of the said seal ring 29 in a fluidtight manner as seen in FIG. 3; hence, neither the priming fluid (electrolyte) nor the gas can then escape anywhere and into the enclosure 15.

By way of example, the container 16 of each cell or generator may comprise six negative electrodes made of lithium, for example, and five positive electrodes having cuprous chloride as active material.

The various cells in the respective containers 16 may be connected either in series, or, if desired, in parallel.

In cases where the electrodes are composed as above, the priming electrolyte is, for example, lithium tetrachloroaluminate dissolved in methyl chloroformate, the neutral gas being argon. The membrane 22 and the partition 27 can be made of stainless steel or tantalum. They can be fixed by welding to their respective supporting parts 20 and 26.

The tubular plunger 28 is held fast against free sliding in the coupling 26 as by protruding wedges or bosses which are not shown. These wedges ensure good static blocking of the plunger 28 and a minimum of friction when this plunger is moved downwardly towards the containers 16, the seal ring 29, of course, yielding sufficiently during downward priming movement of plunger 28 under the force exerted by lever 40 when the latter is pivoted on its axis 41 as described during priming operations.

The upward movement of the plunger 28 is, moreover, prevented as by a stainless steel ring 53 welded to the external surface of said plunger 28 for engagement with the lower end of part 26 as seen in FIG. 2.

The manifold 23 acts as a buffer between the reservoir 19 containing the priming fluid and the cells. Hence, a uniform distribution of the priming fluid among the various cells is obtained via this manifold, even if the entire assembly has a slight slant or cant.

Two end electrodes 17 and 18 of opposite polarities on one of the cells in one of the containers 16 have been diagrammatically shown as well as the electrical connections 54 and 55 associated with these end electrodes and connected respectively to the cell terminals 56 and 57.

For simplicity's sake, the securing devices holding the reservoir 19 and the containers 16 together as a unit in the enclosure 15 have not been illustrated.

Of course, the invention is in no way limited to the embodiment described and illustrated, which has been given only by way of example. More particularly, details may be modified, certain arrangements may be changed or certain means may be replaced by equivalent means within the scope of the appended claims without departing from the scope of the invention. There is no intention, therefore, of limitation to the exact disclosure or abstract herein presented.

What is claimed is:

1. Deferred-action electrochemical generator comprising a container enclosing electrodes in a neutral gas atmosphere, a reservoir containing priming fluid, duct means interconnecting the reservoir and said container, frangible membrane means normally closing off said duct means to prevent flow of priming fluid from the reservoir into the container, conduit means interconnecting the reservoir and the container for permitting flow of gas from the container into the reservoir, frangible partition means normally closing off said conduit means to preclude such flow of gas and also seal said reservoir, priming means for effecting rupture of said frangible partition and of said frangible membrane means for permitting flow of priming fluid from the reservoir into said container and outward flow of gas from the container via said conduit means into said said reservoir thereby effecting activation of said electrochemical generator, the respective flow of fluid from the reservoir into the container and of gas from the latter into said reservoir constituting a fluidtight closed system.

2. Deferred-action electrochemical generator according to claim 1 including a sealed enclosure means surrounding the container and reservoir.

3. Deferred-action electrochemical generator according to claim 1 including a plurality of said containers each enclosing electrodes and wherein said reservoir containing primary fluid including manifold means is connected to distribute said priming fluid to all of said containers from said reservoir upon operation of said priming means.

4. Deferred-action electrochemical generator according to claim 1 including a sealed enclosure means surrounding said container and reservoir, said priming means comprising an operating member located externally of said enclosure means, a pivoted lever internally of said enclosure, a tubular plunger movable by said pivoted lever to effect rupture of said frangible partition means, and a movable perforate tube engageable by said tubular plunger and movable during such engagement to rupture said frangible membrane means whereby operation of said operating member successively ruptures said frangible partition means and said frangible membrane means thus permitting said flow of gas into said reservoir via said conduit means and said flow of priming fluid into said container via said duct means.

5. Deferred-action electrochemical generator according to claim 4 including means to prevent accidental rupturing motion of said movable perforate tube and also accidental rupturing movement of said tubular plunger.

6. Deferred-action electrochemical generator according to claim 4 including means to seal said tubular plunger against leakage.

7. Deferred-action electrochemical generator according to claim 1 wherein said reservoir includes a distributor having therein a duct which said frangible membrane means spans to prevent flow of said priming fluid into said container until rupture of said frangible membrane means is effected, and said reservoir also includes a coupling means at its upper end to which said conduit means is connected, said coupling means being closed off by said frangible partition means in the unruptured condition via said conduit means into said reservoir until rupture of said frangible partition means is effected.

8. Deferred-action electrochemical generator according to claim 7 including a tubular plunger member mounted slidably in said coupling means for movement therein to rupture said frangible partition means upon operation of said priming means, to permit flow of gas from said conduit means into said reservoir.

9. Deferred-action electrochemical generator according to claim 7 including a sealing ring member on said coupling means and plugging means on the upper end of said tubular plunger that sealingly engages said sealing ring member when priming movement of said tubular plunger is effected.

10. Deferred-action electrochemical generator according to claim 9 wherein said tubular plunger has an aperture movable from a closing off position to a registering position relative to said conduit means on operation of said priming means.

11. Deferred-action electrochemical generator according to claim 1 wherein said electrodes in said container are respectively lithium for negative electrode and cuprous chloride containing positive electrodes, said priming fluid is a nonaqueous electrolyte and said neutral gas is argon.

12. Deferred-action electrochemical generator according to claim 11 wherein said nonaqueous electrolyte is lithium tetrachloroaluminate dissolved in methylchloroformiate.

* * * * *